United States Patent
Casais

[19]

[11] Patent Number: 6,033,801
[45] Date of Patent: Mar. 7, 2000

[54] ANTICORROSION BATTERY TERMINAL WITH SHORT ANCHORING, WITHOUT JOINT SEAMS

[76] Inventor: Osvaldo Balbino Casais, Andonaegui 3260, Buenos Aires 1431, Argentina

[21] Appl. No.: 08/941,091

[22] Filed: Oct. 8, 1997

[30] Foreign Application Priority Data

Oct. 9, 1996 [AR] Argentina ............................ 960104674

[51] Int. Cl.[7] .................................................. H01M 2/30
[52] U.S. Cl. ........................................... 429/179; 429/182
[58] Field of Search ..................... 429/179–182, 429/178

[56] References Cited

U.S. PATENT DOCUMENTS

| | | |
|---|---|---|
| 1,248,768 | 12/1917 | Willard . |
| 1,251,452 | 12/1917 | Noble et al. . |
| 1,263,500 | 4/1918 | Willard . |
| 4,701,386 | 10/1987 | Kump et al. ............................ 429/179 |
| 5,077,892 | 1/1992 | Nugent ...................................... 29/874 |
| 5,296,317 | 3/1994 | Ratte et al. ............................. 429/178 |

FOREIGN PATENT DOCUMENTS 1 245 255   8/1971   United Kingdom .

Primary Examiner—Maria Nuzzolillo
Assistant Examiner—Jonathan Crepeau
Attorney, Agent, or Firm—Nikaido, Marmelstein, Murray & Oram LLP

[57] ABSTRACT

A seamless, short-anchor anticorrosion storage battery terminal is provided including an upper portion having a frustoconical hollow body with a cavity, the frustoconical hollow body adapted to emerge from the top of the battery, and wherein there is, at the end of the frustoconical hollow body with the greater cross section, a hollow lower portion whose internal cavity is coaxial with the cavity of the frustoconical body; the hollow lower portion having an uppersegment of cylindrical configuration and diameter greater than that of the end of greater cross section of the frustoconical hollow body, and a lower segment configured as a frustum of a cone, having at the end of greater cross section, means of anchoring and preventing rotation of the terminal including a circumferential projection whose wall defines a number of peripheral cavities opening alternately upward and downward. Alternatively, the means of anchoring and preventing rotation of the terminal may include a circumferential projection whose wall defines a plurality of circumferential mortises, or a circumferential projection which includes a plurality of orifices arranged circumferentially.

8 Claims, 1 Drawing Sheet

ANTICORROSION BATTERY TERMINAL WITH SHORT ANCHORING, WITHOUT JOINT SEAMS

BACKGROUND OF THE INVENTION

1. Field of the Invention

The principal object of this patent of invention is an anticorrosion terminal with short anchoring, without joint seams, for storage batteries, which contributes significant advantages resulting from its minimal corrosion due to migration of the interior electrolyte, from its appreciably lighter weight than the terminals fabricated up to the present, and from the reduced maintenance required during operation of batteries in which the said terminal is used.

More specifically, this patent of invention covers a terminal of the type specified for its use in storage batteries, which has been conceived and developed as a result of experience acquired in the use of these devices to generate electrical energy, and of laboratory tests dedicated to studying the highly harmful process of corrosion of lead alloy terminals, generated by the migration of the electrolyte toward the outer metal surface during the battery's operation. In this sense, the invented terminal reduces such migration to a minimum and, consequently, its outer surface remains clean, preserving a good electrical contact with the terminal of the external circuit to which it is connected. Likewise, the aforementioned substantial diminution of the corrosion permits operation of the battery practically without the need for the customary maintenance tasks of cleaning the terminal. Furthermore, as it contains a lesser amount of material than the terminals used up to the present, it is appreciably lighter, with the additional advantage of lower production costs due to the savings of material and simplicity of the tools used in its manufacture.

2. Description of the Prior Art

As is known, the storage battery comprises a case—generally of thermoplastic material—receiving the electrolyte and the lead plates of positive and negative polarity. In its upper portion, this battery has a top or cover—also of thermoplastic material—through which project, in most battery designs, the upper portions of two lead terminals. This upper portion may take on several configurations, but it is generally constituted by a hollow body forming a frustum of cone whose dimensions are established by the DIN, SAE, SETIA and other standards. In the vicinity of its lower end of greater diameter, this hollow frustum of cone is prolonged in a lower portion, also hollow, which is embedded in the thermoplastic material, and constitutes the portion of the terminal intended for its anchoring in the top or cover. Furthermore, the interior cavity of the upper frustum of cone body and the lower portion of such terminals form the space for housing each of the rods connected respectively to the inside plates of positive and negative polarity.

Each interior rod is connected at or near its upper end to the respective lead terminal by means of a weld using lead or an alloy of this metal, thus achieving the necessary electrical continuity.

As is known, the advanced technology of battery manufacture consists in using injector machines, by means of which the thermoplastic material is injected into the mold which forms the top. In a preliminary operation, the terminals are positioned, manually or automatically, in respective orifices of the mold, and after injection of the molten plastic material at high pressure, the terminals remain adhering to the top by means of their lower portion, partially embedded in the thermoplastic material.

The battery manufacturers and end-product motor vehicle companies set the minimum axial stress and torque which each terminal must withstand without producing a rupture in the metal and/or thermoplastic material of the top. For purposes of satisfying this mechanical securing requirement, several designs for the terminal's lower portion have been developed, all of which assure the anchoring of the lower portion in the top's material.

These designs consist, in general, of a number of circumferential and parallel projections which impede axial displacement, while the means blocking rotary movement may have different configurations, such as a number of cavities into which flows the injected plastic material and which are formed in the perimeter of the side wall, or also a number of projections or teeth which are projected radially, etc. Examples of the configuration of these means to anchor the lower portion of the terminal, can be seen in the drawings of patents U.S. Pat. No. 5,296,317 and EP 261.311.

As can be seen in the cited patents of invention, the configuration of the lower portion of the terminal is such that in the process of manufacturing this metal element, it is necessary to use dies—in the case of cold process stamping and pressure diecasting, or molds—in the case of blast furnace tapping—which, once the piece has been furnished, and owing to its configuration, must be opened horizontally, that is, perpendicular to the terminal's axis of symmetry, in order to remove it from its lodging cavity in the implement. These molds or dies, then, must be constituted of two or more movable parts which once displaced radially, leave burrs or joint seams in the material of the lateral surface of the lower portion of the formed terminal, parallel to its axis of symmetry, and the material's surfaces face and come into contact with the adjacent parts of the die or mold. The thickness of these burrs or joint seams increases as the die or mold ages, as a consequence of the continuous opening and closing of its components.

Tests made with penetrating ink have disclosed that these burrs or joint seams constitute paths through which the electrolyte flows to the outside, causing corrosion of the terminal, to which it adheres. This migration of the electrolyte through the burrs or joint seams is compounded by the capillary migration generated by the internal porosity of the lead alloy, when the terminal is manufactured by means of tapping or pressure diecasting processes.

All of the terminals used up to the present in tops or covers of thermoplastic material for batteries satisfy the aforementioned mechanical anchoring or securing requirement by means of a lower portion embedded in the top, the formation of which requires the use of molds or dies, which must necessarily be opened by displacing their constituent parts perpendicularly to the terminal's axis of symmetry for its extraction after it has been formed. These terminals, in addition to the drawback of having the longitudinal burrs or joint seams, which strongly influence the corrosion process of their outer surface, incur the additional problem that their lower portion—whose length may be as much as ⅓ of the terminal's total length—possess a quantity of lead alloy, which not only lacks function from the electrical point of view, but also unnecessarily adds to the total weight of the terminal.

SUMMARY OF THE INVENTION

The cited problems are resolved with the invented short-anchor anticorrosion storage battery terminal, without joint seams, which in addition to satisfying the requirement for mechanical anchoring or securing in the top's material, with an appreciably reduced amount of lead—up to 40% of the total weight—from that of similar known terminals, has the significant advantage of not having the longitudinal burrs or joint seams on its lower portion, which favor corrosion, by ensuring a hermetic seal which prevents migration of the electrolyte to the outside. This latter feature is made possible by the configuration of the lower portion, which permits fabrication of the terminal using molds or dies which do not need to be opened radially in order to extract the finished terminal.

Another aspect of the greatest importance to bear in mind is the fact that the lead alloy used to fabricate the terminal requires no percentage or content of arsenic—a constituent highly hazardous to health—to prevent deformation of the material under the high injection pressures of the molten plastic. This is a consequence of the configuration or design of the terminal's lower portion embedded in the top, which has a high resistance to the deformation provoked by the cited pressures.

For the purpose of totally eliminating corrosion, the invented terminal will preferably be formed by the known procedure of cold stamping starting with a piece of solid or hollow extruded lead, the process eliminating the internal porosity which facilitates migration of the electrolyte by capillary action toward the outside.

The results mentioned are the direct consequence of the particular configuration and formation of the invented short-anchor storage battery terminal without joint seams, preferably constituted by a hollow, frustoconical body, in the vicinity of whose larger cross-sectional end it possesses a hollow lower portion—for anchoring in the thermoplastic material—whose inner cavity conforms with the frustoconical form. This lower portion is constituted by two segments whose external configuration is such that axial movement of the terminal is impeded or blocked. The first segment is of cylindrical configuration and diameter greater than that of the largest cross section of the frustum of cone, while the second segment is shaped into a frustum of cone, in the vicinity of whose larger cross-sectional end means to block the terminal's rotary movement are formed.

In order to reinforce the advantages thus summarily described, and to facilitate understanding of the constructive, constitutional and functional characteristics of the invented short-anchor anti-corrosion storage battery terminal without joint seams, a preferred application example is described in the following paragraphs and illustrated in the accompanying drawings, with the express clarification that, precisely because this is an example, it is inappropriate to assign it any limiting or restrictive character as to the protection of this patent of invention, but it is used merely as an aid to explain and illustrate the basic concept upon which it is based.

DETAILED DESCRIPTION OF THE PREFERRED EMBODIMENT

In all the Figures, the same reference numbers refer to the same or equivalent parts or elements constituting the whole, according to the application example chosen for this explanation of the invented short-anchor anticorrosion storage battery terminal without joint seams.

Figure 1:
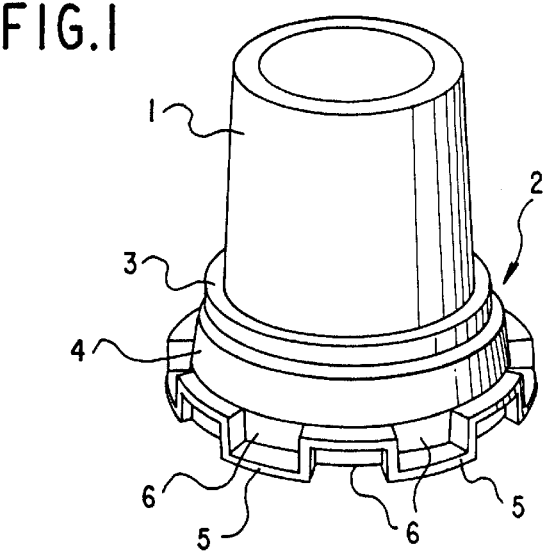
FIG. 1 illustrates a perspective view of the invented short-anchor anticorrosion storage battery terminal without joint seams.

As can be seen in FIG. 1, the invented terminal has an upper portion which, in the illustrated example, consists of a hollow, frustoconical body 1 in the vicinity of whose cross-sectionally larger end it has a hollow lower portion, indicated overall by the reference number 2, which is intended for anchoring the terminal in the thermoplastic material. The lower portion 2 consists of a first segment 3 of cylindrical shape and of a diameter greater than that of the frustoconical body's 1 cross-sectionally larger end, and continues in a second frustoconical segment 4.

As is observed, a circumferential projection 5 is located in the vicinity of the cross-sectionally larger end of segment 4, the wall of said projection 5 defining a number of peripheral cavities 6 which open alternately upward and downward, and in which the thermoplastic material is lodged during the injection, constituting a means of blocking rotary movement of the terminal.

Figure 2:
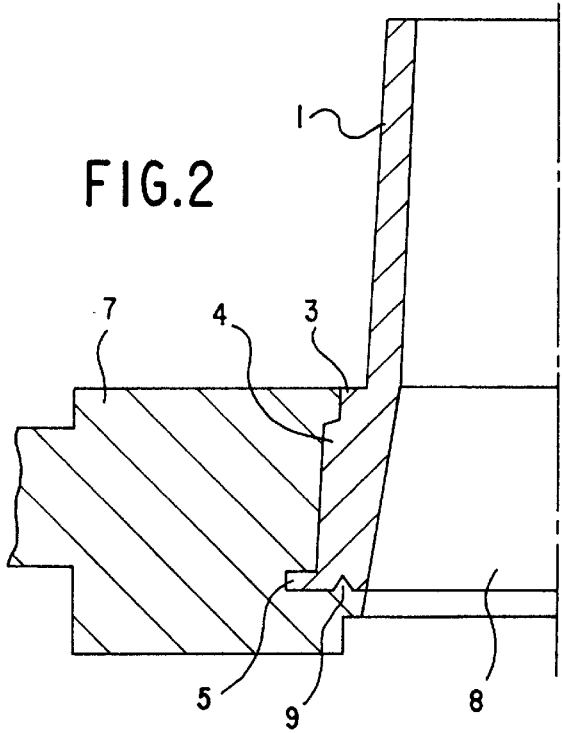
FIG. 2 shows a lengthwise cutaway of the same terminal as in the previous figure, anchored in the battery top.

FIG. 2 shows a lengthwise cutaway of the same terminal as in the previous figure, molded in the battery's top or cover 7. As is seen, the hollow lower portion 2 comprises an internal frustoconical cavity 8 coaxial with the internal cavity of the frustoconical body 1. A circumferential groove 9 formed on the lower surface increases the path of a possible migration of electrolyte throughout the surface of contact between the lead alloy and the thermoplastic material.

As shown, the lower portion 2 is totally embedded in the thermoplastic material, in a manner such as to impede axial movement of the terminal, while the peripheral cavities 6 block its rotary movement. Likewise, this portion 2 has a configuration which is highly resistant to the deformation caused by the high injection pressures, making it possible to use a lead alloy with no arsenic content.

Figure 3:
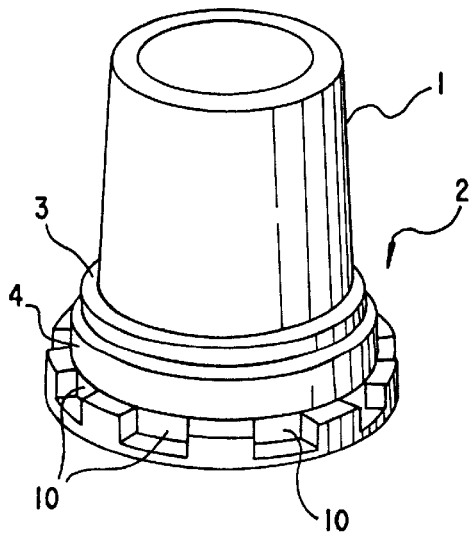
FIGS. 3 and 4 illustrate the invented terminal with different variants of the means blocking rotary movement of the terminal.
Figure 4:
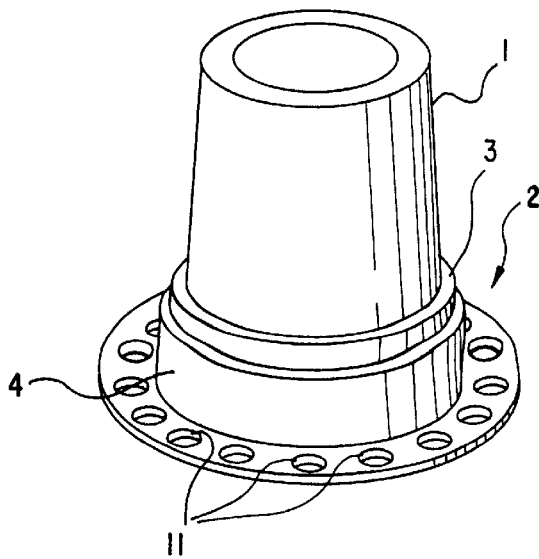

FIG. 3 illustrates the invented terminal with means blocking rotary movement formed by a number of circumferential mortises 10, while FIG. 4 shows the same terminal, in whose lower portion 2 there are a number of orifices 11, in which the molten thermoplastic material is deposited or lodged.

In addition to the application variants of the example illustrated, the protective scope of this patent of invention is further defined by the claims which follow.

I claim:

1. A seamless, short-anchor, anticorrosion storage battery terminal, comprising an upper portion having a frustoconical hollow body with a cavity, the frustoconical hollow body adapted to emerge from the top of the battery, wherein there is, at the end of the frustoconical hollow body with the greater cross section, a hollow lower portion whose internal cavity is coaxial with the cavity of the frustoconical body; the hollow lower portion having an upper segment of cylindrical configuration and diameter greater than that of the end of greater cross section of the frustoconical hollow body, and a lower segment configured as a frustum of a cone, having at the end of greater cross section, means of anchoring and preventing rotation of the terminal including a circumferential projection whose wall defines a number of peripheral cavities opening alternately upward and downward.

2. A terminal as claimed in claim 1, wherein the internal cavity of said lower hollow portion is frustoconical.

3. A terminal as claimed in claims 1 or 2, wherein the hollow lower portion has at least one circumferential groove formed in its lower surface.

4. A terminal as claimed in claim 1, wherein said terminal is formed from an arsenic-free lead alloy.

5. A seamless, short-anchor, anticorrosion storage battery terminal, comprising an upper portion having a frustoconical hollow body with a cavity, the frustoconical hollow body adapted to emerge from the top of the battery, wherein there is, at the end of the frustoconical hollow body with the greater cross section, a hollow lower portion whose internal cavity is coaxial with the cavity of the frustoconical body; the hollow lower portion having an upper segment of cylindrical configuration and diameter greater than that of the end of greater cross section of the frustoconical hollow body, and a lower segment configured as a frustum of a cone, having at the end of greater cross section, means of anchoring and preventing rotation of the terminal including a circumferential projection whose wall defines a plurality of circumferential mortises.

6. A terminal as claimed in claim 5, wherein said terminal is formed from an arsenic-free lead alloy.

7. A seamless, short-anchor, anticorrosion storage battery termin comprising an upper portion having a frustoconical hollow body with a cavity, the frustoconical hollow body adapted to emerge from the top of the battery, wherein there is, at the end of the frustoconical hollow body with the greater cross section, a hollow lower portion whose internal cavity is coaxial with the cavity of the frustoconical body; the hollow lower portion having an upper segment of cylindrical configuration and diameter greater than that of the end of greater cross section of the frustoconical hollow body, and a lower segment configured as a frustum of a cone, having at the end of greater cross section, means of anchoring and preventing rotation of the terminal including a circumferential projection which includes a plurality of orifices arranged circumferentially.

8. A terminal as claimed in claim 7, wherein said terminal is formed from an arsenic-free lead alloy.

\* \* \* \* \*